United States Patent
Colt

[15] 3,697,771
[45] Oct. 10, 1972

[54] CARPET CLEANING APPARATUS WITH ELECTRICAL POWER CONDITIONING MEANS

[72] Inventor: James G. Colt, Belmont, Mass.

[73] Assignee: Carpetech Corp., Everett, Middlesex, Mass.

[22] Filed: June 21, 1971

[21] Appl. No.: 154,889

[52] U.S. Cl. .............................. 307/154, 318/225 R
[51] Int. Cl. ........................................................ H02j
[58] Field of Search................. 307/43, 85, 147, 154; 318/225 R

[56] References Cited

UNITED STATES PATENTS

| | | | |
|---|---|---|---|
| 2,613,343 | 10/1952 | Ober | 307/85 X |
| 3,477,001 | 11/1969 | Spinrad et al. | 318/225 R X |
| 3,601,618 | 8/1971 | Toyonako et al. | 318/225 R X |

*Primary Examiner*—William M. Shoop, Jr.
*Attorney*—Melvin E. Frederick

[57] ABSTRACT

There is disclosed apparatus for cleaning carpets, upholstery and the like utilizing a motor driven separate reservoir system for supplying a cleaning solution to a cleaning head, a separate motor driven vacuum pick-up system for storing cleaning solution picked up via the cleaning head, and a power control system for safely and dependably supplying from two separately fused convenience electrical outlets, electrical current to the power consuming devices including the drive motors of the apparatus, one of which devices may have power demand characteristics in excess of that suppliable from one or both outlets. Typically, the reservoir system may include means to continuously heat the cleaning solution in the reservoir and a fluid pump driven by an electric drive motor and the vacuum system may include a vacuum pump which is driven by a second electric drive motor. The power control system which is not limited to use with carpet cleaning apparatus comprises means to provide a predetermined orientation of the connections to the convenience outlets, means to determine the level of voltage produced by the combination of the orientated connections, and means for providing the desired voltage to the power consuming device with current limiting and protection features where required.

39 Claims, 19 Drawing Figures

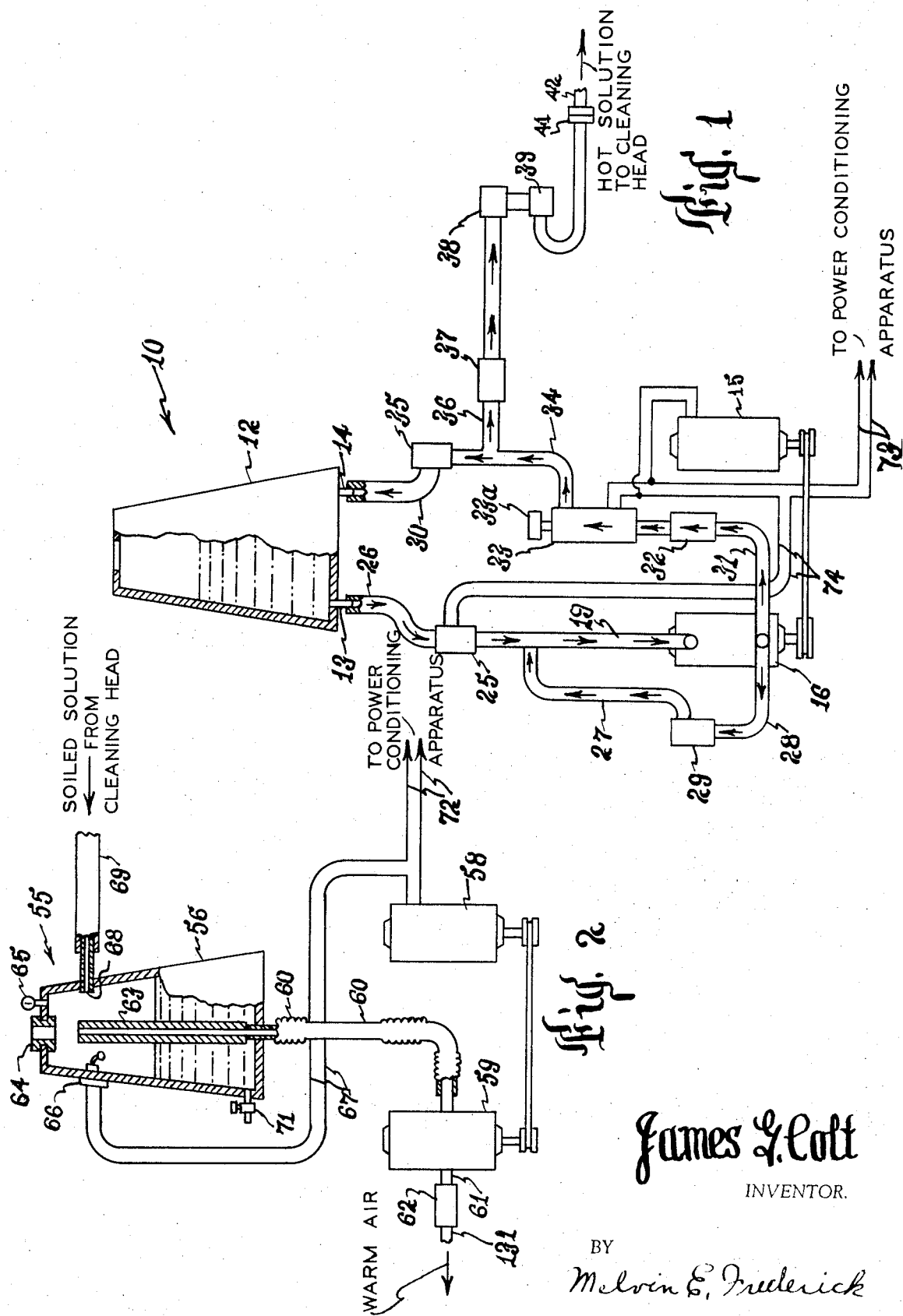

TYPICAL 3 PHASE, 4 WIRE 120/208 VOLT SYSTEM

TYPICAL SINGLE PHASE, 3 WIRE 115/230 VOLT SYSTEM

OUTLET #1 REVERSED

OUTLET #2 REVERSED

OUTLET #1 & #2 REVERSED

INVENTOR
James L. Colt

BY Melvin E. Frederick
ATTORNEY

James L. Colt
INVENTOR.

BY
Melvin E. Frederick

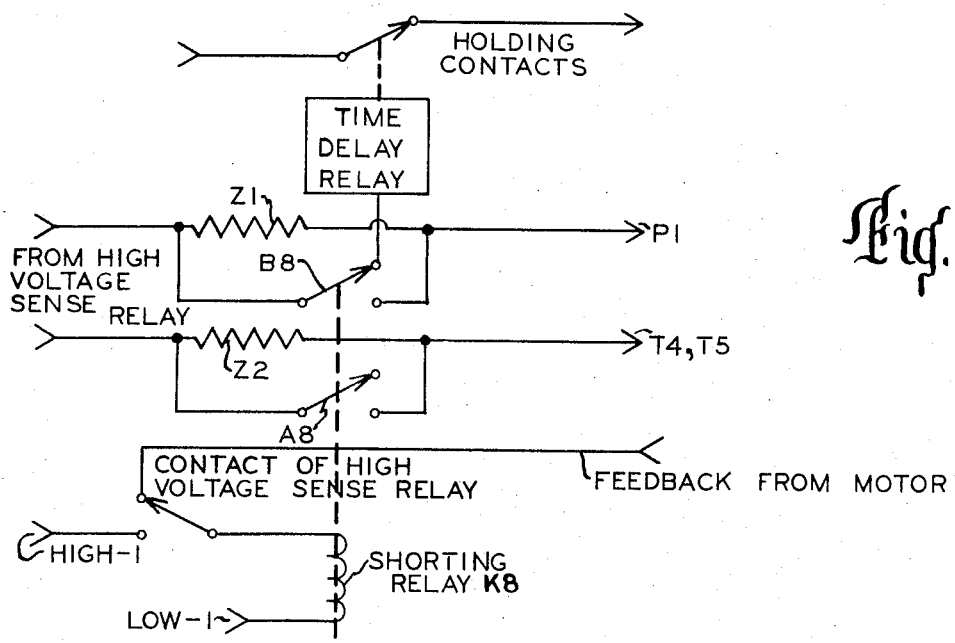
Fig. 14
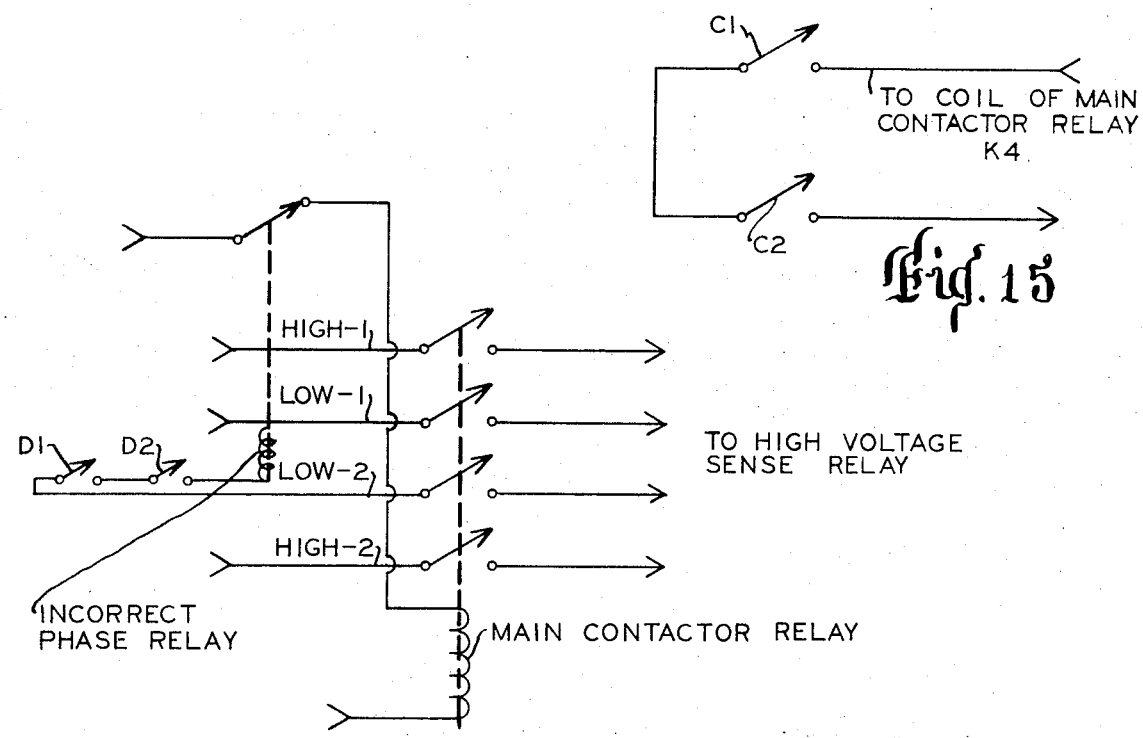
Fig. 15
Fig. 16
James G. Colt
INVENTOR.
BY
Melvin E. Frederick

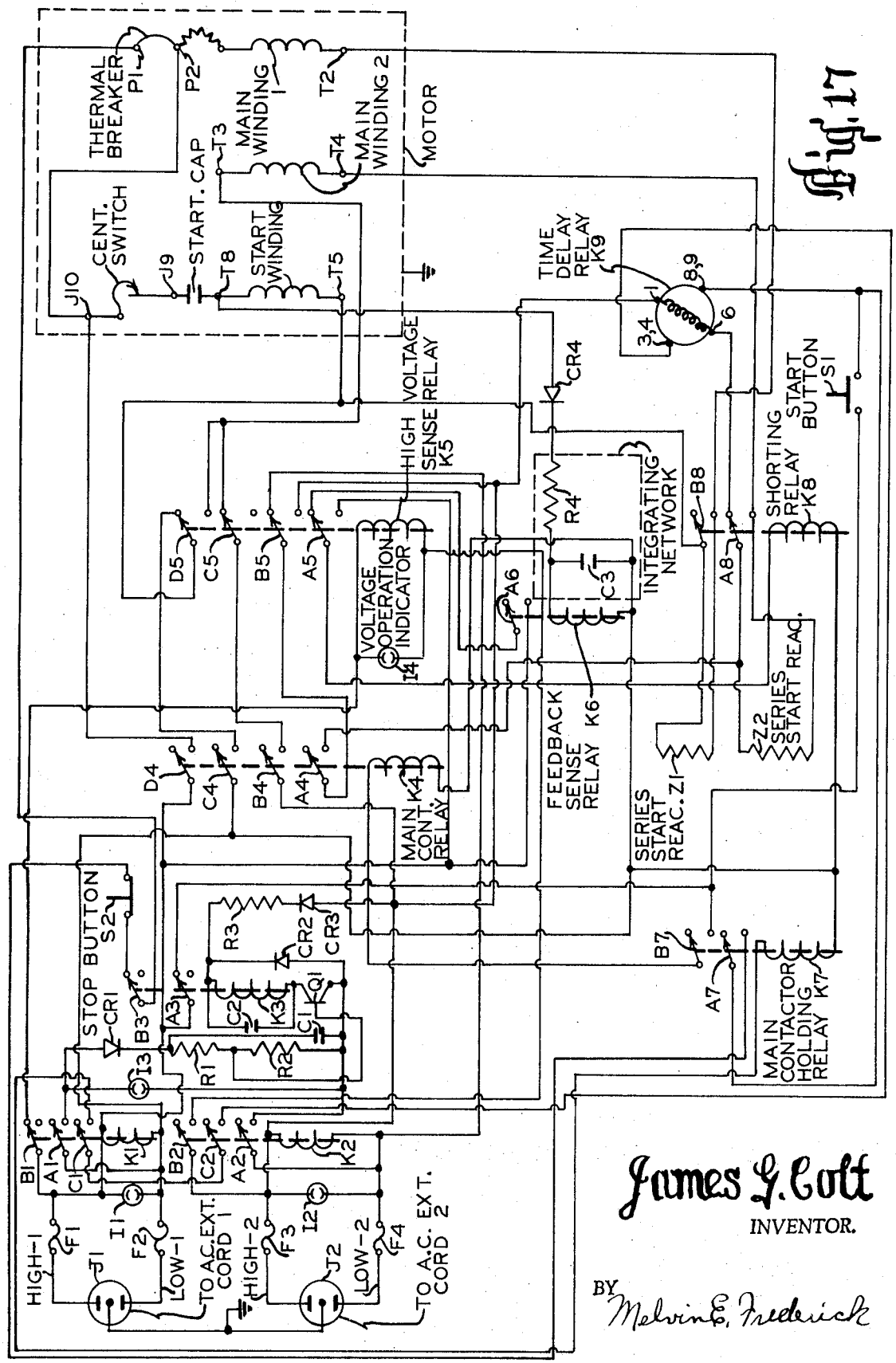

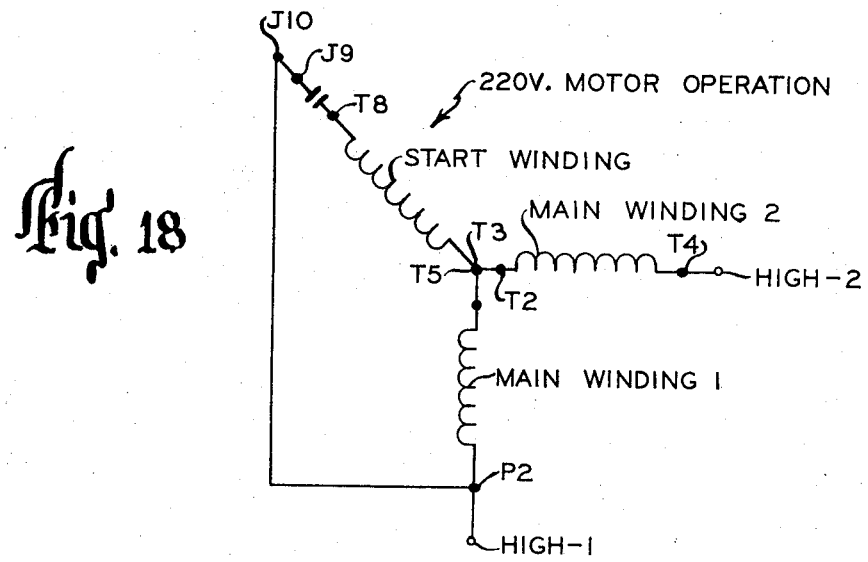

CARPET CLEANING APPARATUS WITH ELECTRICAL POWER CONDITIONING MEANS

The present invention relates to a method of and apparatus for conditioning electrical power supplied from a plurality of separate sources to apparatus having electrical power consuming devices and more particularly to apparatus incorporating such power conditioning apparatus such as carpet cleaning apparatus having a plurality of power consuming devices one of which may during start-up require current in excess of that available from two outlets and/or during operation require current in excess of that available from one outlet.

In the cleaning of carpets and upholstery, it has been found effective to discharge a jet of pressurized cleaning solution into the pile, nap, or weave of the fabric to be cleaned, and to thereafter apply suction to the fabric to withdraw the used cleaning solution from the fabric together with the dirt loosened and ingrained in the cleaning solution.

Cleaning apparatus of the type referred to above may comprise, for example, a liquid tank and vacuum tank mounted on a base structure housing a drive motor for each tank and its associated components. The motor for the vacuum tank drives a suction blower, the intake side of which is coupled to the interior of the vacuum tank while the discharge side of the vacuum blower discharges to the atmosphere either directly or through a muffler. A liquid pump driven by the aforementioned motor or preferably, a separate motor, is connected to draw liquid from the liquid tank and feed the liquid under pressure to heating means whereafter the liquid is then discharged through a hose and control valve to a spray or cleaning head adapted to discharge the heated liquid onto the material being cleaned.

Other cleaning devices particularly devoted to commercial cleaning fields have been provided which include fluid distribution means and a vacuum means for picking up fluid and loosened material from surfaces after the surface has been scrubbed by brushes or the like. Still other devices have been provided which include means for high pressure fluid distribution and vacuum pick-up means for receiving the fluid delivered to the surface to be cleaned. The pick-up fluid may or may not be returned for recirculation. These latter devices operate on the principle that the high pressure fluid delivery serves as the cleaning and scrubbing element thereby eliminating the use of brushes or other scrubbing devices.

Whether one is concerned with a two-tank cleaning apparatus as described above or any other apparatus having similar power requirements, in every case the power consuming characteristic of the apparatus has in the past been effectively limited to relatively low levels. This power limitation is due to the fact that the National Electric Code requires that all residential and industrial conventional convenience outlets be wired and fused for only 15 amperes.

In the past this limitation in available electrical power from any convenience outlet has severely limited the design, capability, and efficiency of such devices because their electrical power consumption must be limited to relatively low values, even if separate electrical devices are provided for connection to separate outlets as taught in patent application Ser. No. 25,521, filed Apr. 3, 1970, and assigned to the same assignee as this patent application. It is, therefore, an object of the invention to provide a method of and apparatus for conditioning electrical power whereby current in excess of that available from one convenience outlet may be obtained by the connection of a power consuming device to two convenience outlets.

Another object of the invention is to provide a method of and apparatus for devices such as electrical motors which require during start-up electrical current in excess of that available from two convenience outlets whereby they may be satisfactorily operated by means of a simultaneous connection to two such outlets.

A further object of the invention is to provide improved carpet cleaning apparatus having two drive motors one of which during start-up normally requires electrical current in excess of that available from two conventional convenience electrical outlets.

A still further object of the invention is to provide carpet cleaning apparatus having two drive motors one of which during start-up normally requires electrical current in excess of that available from two convenience electrical outlets by means of connection to two such outlets.

Another object of the invention is to provide carpet cleaning apparatus that is improved and more efficient than that heretofor available.

A further object of the invention is to provide carpet cleaning apparatus having at least one electrical drive motor which during start-up requires electrical current in excess of that available from two convenience outlets.

A still further object of the invention is to provide electrical power conditioning means for supplying electrical power from two separate sources to at least one electrical power consuming device that simultaneously supplies said power to said device while preventing application of said power that is not phased properly and preventing inadvertent shorting together two of the input lines to said sources that are not at the same potential.

A further object of the invention is to supply current from two separate sources to at least one power consuming device while providing for protection against the application of voltage to the device when only one of the two sources has voltage available and to disconnect said sources from said device in the event of loss of power from one of said two sources.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

FIG. 1 is a diagrammatic view of a reservoir system having an electrical drive motor adapted for connection to power conditioning apparatus;

FIG. 2 is a diagrammatic view of a vacuum pick-up system having an electrical drive motor adapted for connection to power conditioning apparatus;

Figure 5:
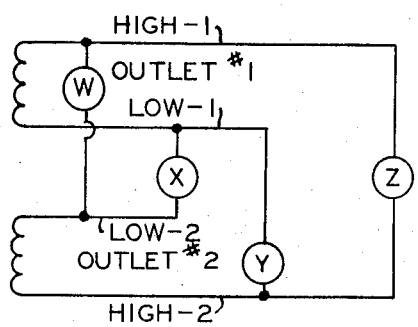
Figure 6:
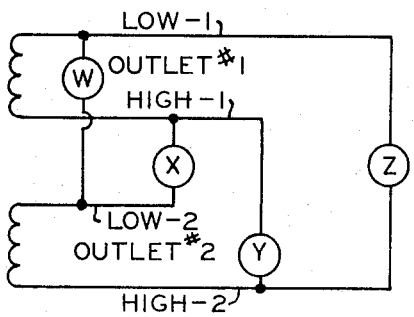
Figure 7:
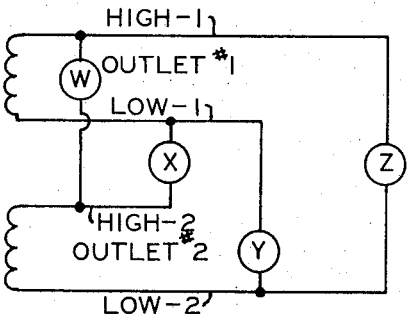
Figure 8:
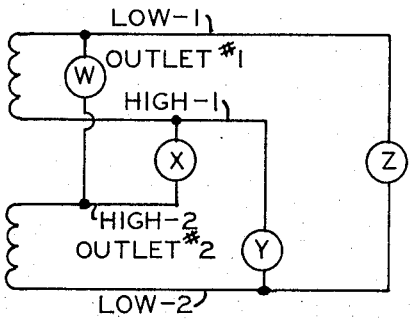

FIGS. 5-8 are schematic diagrams for purposes of explanation of outlets with "indicators", and with FIG. 5 as a reference, outlet 1 being reversed in FIG. 6, outlet 2 being reversed in FIG. 7, and both outlets 1 and 2 being reversed in FIG. 8.

Figure 9:
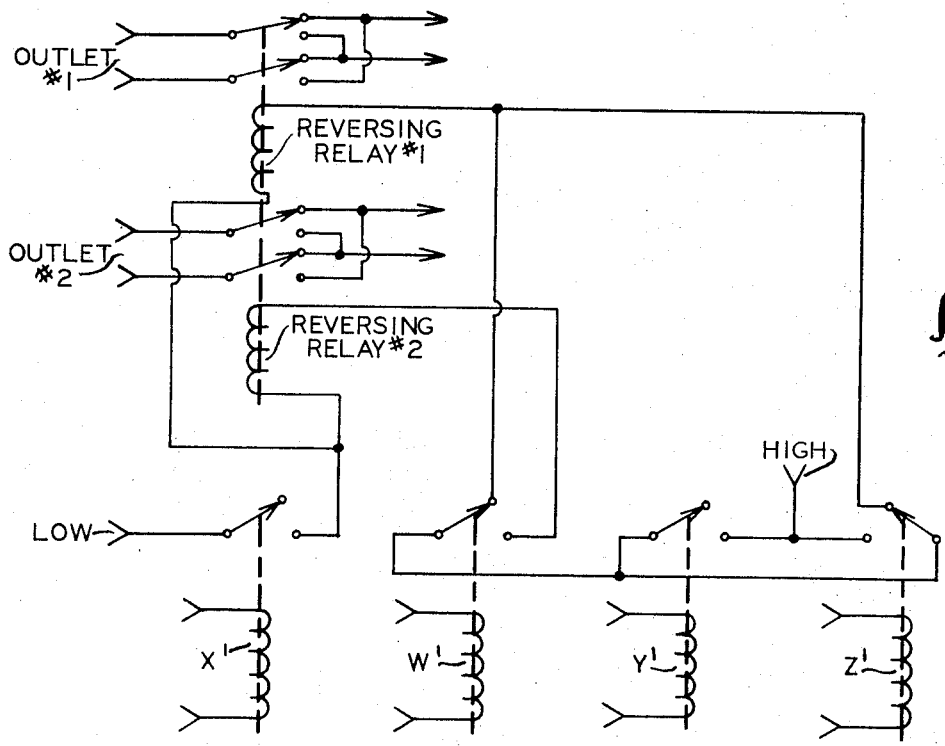
Figure 10:
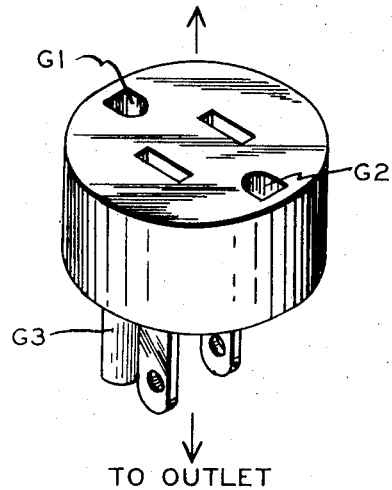
Figure 11:
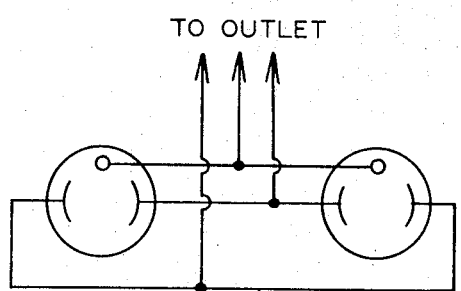
Figure 12:
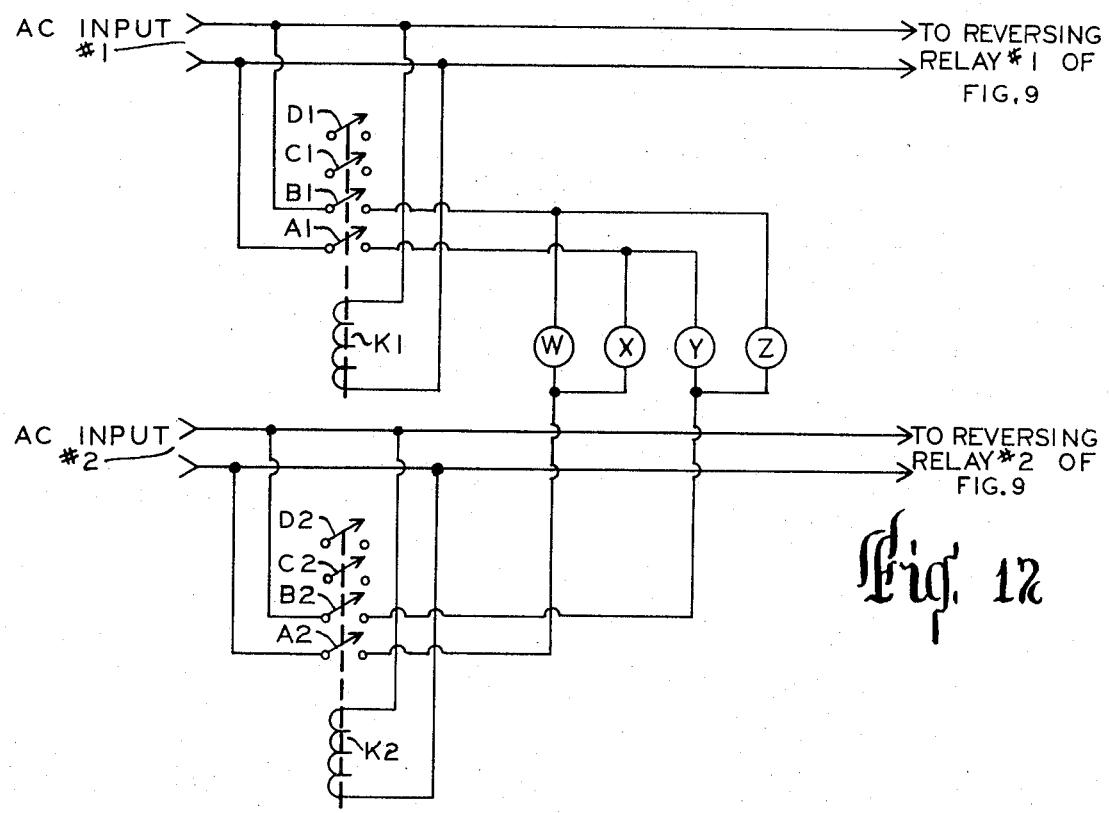
Figure 13:
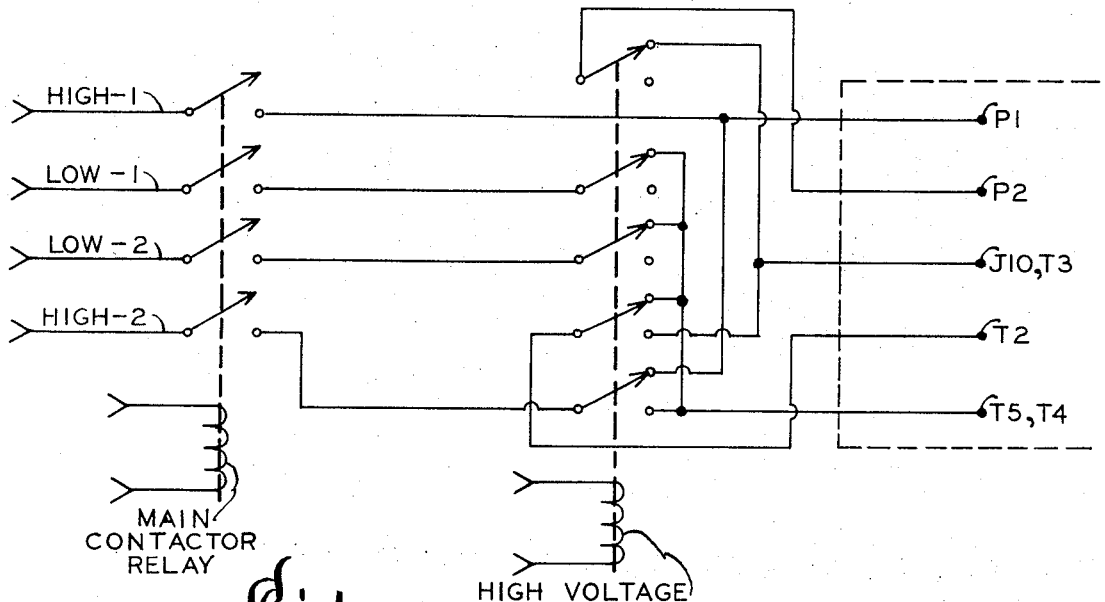

FIG. 9 is a schematic diagram for providing the conditions of FIG. 5;

FIG. 10 is a perspective view of an adapter for three wire electrical outlets that may be used for one embodiment of the invention;

FIG. 11 is a diagrammatic representation of another adapter;

FIG. 12 is a schematic representation of means for preventing the terminals of one power cord from becoming "hot";

FIG. 13 is a schematic diagram of main contactor relay and high voltage sense relay means for properly connecting the obtained voltage to a specific motor load;

FIG. 14 is a schematic diagram of means for inserting start-up impedances in input lines of a specific motor load;

FIG. 15 is a schematic diagram of means for disconnecting the load in the event of loss of power from one of the outlets;

FIG. 16 is a schematic diagram of means to disconnect the load in the event of improper phasing of the two outlets;

FIG. 17 is a schematic diagram of one embodiment of power conditioning apparatus in accordance with the invention for supplying power to an electric motor and substantially incorporating the means shown in FIGS. 11-16;

FIG. 18 is a schematic of the motor of FIG. 17 connected for 208/230 volt operation; and FIG. 19 is a schematic of the motor of FIG. 17 connected for 115/120 operation. at While not specifically limited thereto, for convenience the present invention will be described in connection with carpet cleaning apparatus comprising a reservoir system and a vacuum tank pick-up system.

Directing attention now to the drawings, in FIG. 1 is shown a reservoir system designated generally by the numeral 10. The reservoir system may be supported by an acoustically insulated base housing (not shown), the reservoir or solution tank 12 being removably attached as by hooks or the like (not shown) to the upper surface of the housing and the balance of the reservoir system more fully described hereinafter being contained in conventional manner within the base housing.

At the base of the reservoir tank are provided two connections 13 and 14 preferably of the conventional "quick disconnect" type so that the reservoir tank can be simply, quickly, and without loss of fluid, removed from the base housing while still containing a liquid or cleaning solution. Disposed within and supported by the base housing is an electric drive motor 15 of such power rating and speed more fully described hereinafter, coupled, for example, in conventional driving relationship via pulleys to a solution or liquid pump 16. While the electric drive motor should meet certain power requirements set forth hereinafter, the specific type of liquid pump employed is not material, and since several well-known types are suitable for the purpose, the details thereof are not illustrated or described herein. As and for the purposes more fully set forth hereinafter, the drive motor 15 must be of a type and capacity that during operation with the current drawn by the heater means and the current drawn by the vacuum tank pick-up system, that the combination does not draw current in excess of that available from two conventional residential and industrial convenience circuits fused in accordance with the National Electrical Code.

The inlet or low-pressure side of the liquid pump 16 is connected by a conventional pipe or liquid supply line 19, a pressure sensitive switch 25, and a flexible hose 26 to the quick disconnect connection 13.

The inlet and outlet sides of the liquid pump are coupled through conventional by-pass means including pipes 27 and 28 and a pressure regulator 29 for maintaining a predetermined pressure at the outlet of the liquid pump. The liquid pump may be of a conventional type as noted above. The pressure regulator 29 which also is of the conventional types preferably is adjustable to permit adjustment of the output pressure of the solution pump. When heated cleaning solution is desired the outlet of the liquid pump 16 communicates through pipe 31 and a one-way check valve 32 with the lower end of a conventional electrical type heater means 33 for increasing or raising the temperature of the cleaning fluid to a suitable temperature to provide at its outlet fluid at a temperature of, for example, about 160°F. A suitable heater may include an adjustable thermostat means 33a to limit the maximum temperature of the liquid heated by the heater.

The outlet side of the heater 33 communicates through one port of a T-connection via pipe 34, flexible hose 30, a pressure regulator 35, and connection 14 with the interior of the reservoir tank 12. Through the other port of the T-connection, the outlet of the heater also communicates via pipe 36, filter 37, adjustable flow pressure valve 38, pressure gauge 39 and a quick disconnect connection 41 with an insulated and flexible high temperature fluid hose 42, the remote end of which hose communicates with a cleaning head (not shown). As will now be apparent, heated fluid may flow from the heater 33 in one of two directions, the first of which is through pressure regulator 35 and back into the reservoir tank and the second of which is via pipe 36 and flexible hose 42 to the cleaning head. Pressure regulator 35 is adjusted to open and permit heated fluid to pass there through when the pressure in line 34 is slightly less than the pressure at which regulator 29 in the liquid pump by-pass circuit is set.

When the control valve in the cleaning head is in its normally closed position, thereby preventing the discharge of cleaning fluid (or flexible hose 42 is disconnected thereby closing line 36 at connection 41), cleaning fluid in the reservoir tank will be continuously supplied to the heater 33, heated, and then circulated back into the reservoir tank 12. The adjustable flow pressure valve 38, pressure gauge 39, and one-half of connection 41 are mounted in the base housing. The quick disconnect connection 41 is, of course, poled such that the high temperature fluid line 36 is closed when the flexible hose 42 to the cleaning head is disconnected.

When the high temperature fluid line 36 is coupled to a suitable cleaning head (not shown) via hose 42 and the control valve at the cleaning head is opened, the heated fluid which previously was flowing back into the reservoir tank via pressure regulator 35 can flow through the high temperature flexible hose 42 and be discharged at the cleaning head because the pressure on the heater outlet side of pressure regulator 35 drops below the critical pressure at which it is set and, accordingly, pressure regulator 35 closes. Upon closure of regulator 35, the heated fluid is directed to the cleaning head. When the control valve on the cleaning head is closed or hose 42 is disconnected, the pressure on the heater side of pressure regulator 35 increases to substantially that of regulator 29, thereby causing pressure regulator 35 to exceed its critical pressure and, hence, open and permit heated cleaning fluid to again be circulated back to the reservoir tank. As will now be obvious there is a continuous flow of fluid from the reservoir tank to the heater and thence back to the reservoir tank except when fluid is permitted to be discharged at the cleaning head. This permits the solution in the tank to be continuously increased toward and/or maintained at the maximum desired operating temperature thereby allowing maximum cleaning capability to be effected by the cleaning solution.

Directing attention now to FIG. 2 there is shown a vacuum tank pick-up system generally designated by the number 55 comprising a vacuum tank 56 which may be removably supported as by hooks (not shown) on a second base housing (not shown), a second drive motor 58, and a suction blower 59. The suction blower may be of the positive displacement type. The specific type of suction blower employed is not material and since several well-known types are suitable for the purpose, the details thereof are not illustrated or described herein. The outlet or high pressure side of the suction blower 59 communicates through a pipe 61 with one end of a silencer 62 which may be a conventional muffler of the type used to muffle the exhaust noise of internal combustion engines and the like. The silencer 62 is preferably supported within the base housing.

A suction type flexible hose 60 is connected to the inlet or low pressure side of the suction blower 59 and extends upwardly through a hole in the base housing 57. The upper end of the flexible hose 60 is removably fitted onto the lower end of a suction tube 63 incorporated axially in the vacuum tank 56. The flexible hose 60 preferably is of the annularly corrugated, axially resiliently extensible type to permit it to be easily connected and disconnected from the axial tube 63 of the vacuum tank 56.

The vacuum tank is of the same size and generally of the same structure as the reservoir tank. Each may comprise a conventional domed bottom, sealed into the lower end of a conical wall having a radially inwardly extending shoulder. While the upper end of the reservoir tank is open, that of the vacuum tank is closed, and has a suction relief valve 64 mounted thereon. The suction relief vaLve 64 is so adjusted that when the pressure within the vacuum tank drops below a pre-set minimum of the relief valve, the latter will open to permit atmospheric air to bleed in and thus limit the vacuum in the tank to the desired level. A conventional vacuum gauge 65 is mounted on the vacuum tank to indicate the degree of vacuum therein. Also mounted on the vacuum tank is a soiled water level control switch 66. Switch 66 is connected in series via conductor 67 with the drive motor 58 to shut the motor off when the liquid level in the vacuum tank approaches the top thereof. Also provided adjacent the top of the vacuum tank is a suction inlet 68 for communicating the vacuum hose 69 with the interior of the vacuum tank. The remote end of the vacuum hose 69 is coupled to the cleaning head. A drain valve 71 is also provided at a low point in the vacuum tank for draining soiled cleaning solution therefrom. A conductor 72 is provided for connection to power conditioning apparatus more fully described hereinafter, for supplying power to the motor. Similarly, a conductor 73 is also provided for connecting drive motor 15 of the reservoir system to the aforementioned power conditioning apparatus. Pressure switch 25 is connected in series with electric motor 15 via conductors 74. Pressure switch 25 in the reservoir system is effective to shut off motor 15 when the pressure, and, hence, the fluid level in reservoir tank 12 reaches a suitable predetermined low value.

Reference has earlier been made to an inherent limitation of the power consuming characteristics of apparatus utilizing electrical power consuming devices, such as, for example, portable carpet cleaning apparatus which must draw its current from conventional convenience outlets. Since all of such outlets must be assumed to be both wired and fused in accordance with code requirements (typically fifteen to twenty amperes), and since permissable variations in wiring the distribution system are not only possible but do in fact exist (three phase and/or single phase systems for example), it has been necessary in the past that start-up and operating characteristics of drive motors, for example, be limited to that permitted by the power obtainable from a single outlet.

So that the present invention and the problems and disadvantages simply, conveniently and safely overcome therewith can be more easily understood, the following discussion is provided.

Figure 3:
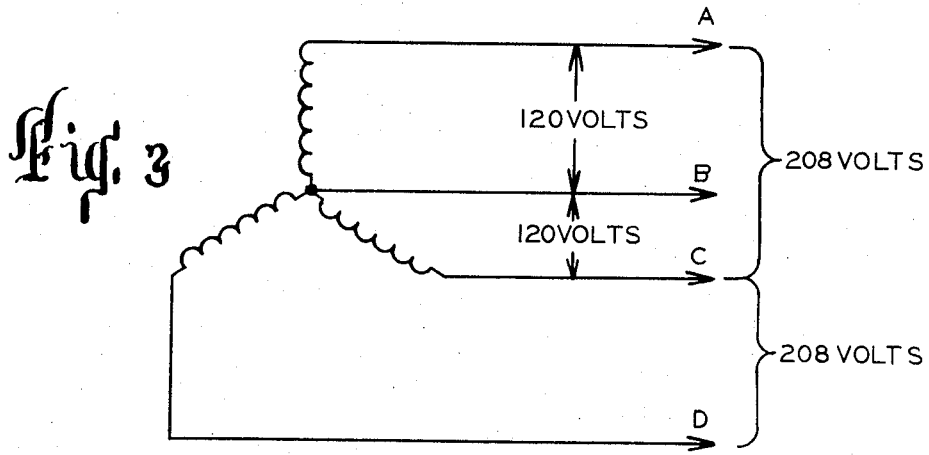
FIG. 3 is a schematic of a typical three phase, four wire 120/208 volt distribution system.
Figure 4:
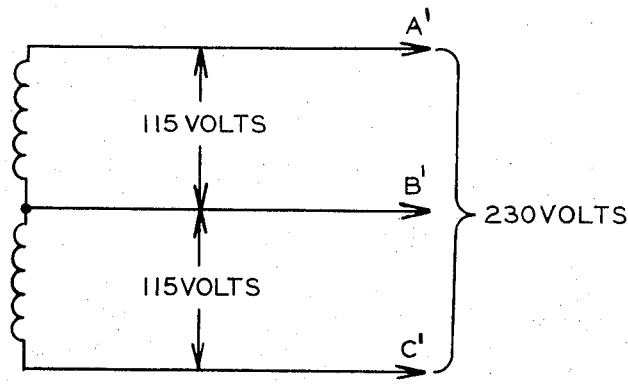
FIG. 4 is a schematic of a typical three wire, single phase 115/230 volt distribution system.

The common AC voltage distribution systems for buildings, plants, or residences in the Continental United States are (a) three phase, four wire 120/208 volt systems as typically illustrated in FIG. 3 or (b) single phase, three wire 115/230 volt systems as typically illustrated in FIG. 4.

Referring to FIGS. 3 and 4, power is distributed throughout a building or residence to individual convenience outlets as shown at a potential of either 115 or 120 volts and a third wire (not shown) is normally provided as an "earth" or "safetyy" ground on all convenience outlets that are part of recently installed systems. Further, these 115 volt or 120 volt outlets are normally protected by fuses or circuit breakers which break the electrical circuit if the current exceeds 15 or 20 amperes for more than a very short time interval.

The above described wiring system serves to accommodate the lighting devices, appliances, et cetera which are normally connected to these convenience outlets. However, for applications requiring more current than that which is available from a single outlet, means must be provided whereby current in excess of that available from one outlet may be safely obtained by the connection of a power consuming device to two convenience outlets. The proper utilization of two such separately fused circuits in accordance with the invention may be understood by a discussion of the routings of the individual circuits.

The present invention comprises a method and apparatus for use with devices such as motors, which for example during start-up normally require electrical current in excess of that available from two such outlets in combination, whereby they may be satisfactorily and safely operated by means of a simultaneous connection to two such outlets.

Referring to FIGS. 3 and 4, it may be observed that two such circuits as shown in these figures are similar in the following respects: (1) convenience outlets connected between lines A and B, lines B and C or B and D of FIG. 3 have approximately the same output voltage value as outlets connected between lines A' and B' and C' of FIG. 4, i.e., 115 or 120 volts, (2) the voltage between lines A and C for example of FIG. 3 and lines A' and C' of FIG. 4 are sufficiently similar (208 to 230 volts) to enable satisfactory operation of presently available motors and other devices on either of the two available voltages, and (3) line B serves as the midpoint or center tap between lines A and C of FIG. 3 just as line B' serves as the midpoint or center tap between lines A' and C' of FIG. 4.

Now, in considering FIG. 3, if lines A and B are connected to supply 120 volts to a given convenience outlet, and lines B and C are connected to supply 120 volts to a second convenience outlet, consideration must be given to the possibility that no correlation may exist in the manner in which the terminals of the two outlets are wired; as a result, the potential difference between one of the terminals of the first outlet which may be wired to line A or B and one of the terminals of the second outlet which may be wired to line B or C cannot be ascertained with assurance without some type of measurement. In a like manner, if lines A and B are connected to two separate outlets, there is no assurance that these two outlets are wired in an identical manner such that it could be said without measurement, for example, that when viewing any given electrical outlet, no voltage existed between the "left-most" terminal of outlet No. 1 and the "left-most" terminal of outlet No. 2. If this condition exists, it follows that no voltage will exist between the "right-most" terminal of outlet No. 1 and the "right-most" terminal of outlet No. 2.

Consonant with the desire to combine at the input to a single device such as a motor, the power from two separate convenience outlets, assume now for purposes of explanation that it is desired to insert the plugs of two separate power cords into two conventional convenience outlets wired within the systems illustrated in FIG. 3 or FIG. 4; that the terminals of Plug No. 1 are designated 1 and 2; that the terminals of Plug No. 2 are designated 3 and 4; and that the voltage between the terminals of respectively Plugs No. 1 and No. 2 is always 115/120 volts. Six possibilities exist as illustrated in Table I below.

TABLE I 1)  1 to 3 = 0
    2 to 4 = 0                  Two outlets in phase from lines
                                AB, A'B', BC or B'C'
    1 to 4 = 115/120
    2 to 3 = 115/120
2)  1 to 3 = 120/115            Two outlets out of phase from
                                lines AB, A'B', BC or B'C'
    2 to 4 = 120/115
    1 to 4 = 0
    2 to 3 = 0
3)  1 to 3 = 208/230            1 to 3 = A to C or A' to C'
    2 to 4 = 0                  2 to 4 = B to B or B' to B'
    1 to 4 = 115/120
    2 to 3 = 115/120
4)  1 to 3 = 0                  1 to 3 = B to B or B' to B'
    2 to 4 = 208/230            2 to 4 = A to C or A' to C'
    1 to 4 = 115/120
    2 to 3 = 115/120
5)  1 to 3 = 115/120            2 to 3 = B to B or B' to B'
    2 to 4 = 115/120            1 to 4 = A to C or A' to C'
    1 to 4 = 208/230
    2 to 3 = 0
6)  1 to 3 = 115/120            1 to 4 = B to B or B' to B'
    2 to 4 = 115/120            2 to 3 = A to C or A' to C'
    1 to 4 = 0
    2 to 3 = 208/230

FIG. 3 and FIG. 4 show that any 115/120 volt convenience outlet will have as one of its connections, line B or B' and as one of its connections line A or C for FIG. 3 and line A' or C' for FIG. 4. Referring now to FIGS. 5-8, in considering any two convenience outlets, and referring to them as outlet 1 and outlet 2, as shown in these figures, the terminal of outlet 1 connected to line B or B' is for convenience designated Low-1 and the terminal connected to line A, C, A' or C' is designated High-1; in a like manner, the terminal of outlet 2 connected to B or B' is designated Low-2 and the terminal connected to A, C, A' or C' is designated High-2. With these designations FIGS. 5-8 in combination with TABLE II set forth below is helpful in illustrating the effect of reversing either or both connections to the two convenience outlets; to further illustrate this effect, indicator means designated W, X, Y and Z are shown in FIGS. 5-8 and for FIG. 5, shown as connected from High-1 to Low-2, Low-1 to Low-2, Low-1 to High-2, and High-1 to High-2 respectively. Column I indicates for each of FIGS. 5-8 the voltages to be expected across respectively indicator means W, X, Y, and Z if High-1 and High-2 are connected across 208–230 volts, whereas Column II indicates the voltages to be expected across respectively indicator means W, X, Y, and Z if High-1 and High-2 have 115–120 volts potential difference.

TABLE II

|        | Column I<br>High-1 and High-2 have<br>potential difference<br>of 208–230 V. | Column II<br>High-1 and High-2 have<br>potential difference<br>of 115–120 V |
|--------|---|---|
| FIG. 5 | W = 115/120<br>X = 0 | W = 115/120<br>X = 0 |
|        | Y = 115/120<br>Z = 208/230 | Y = 115/120<br>Z = 0 |
| FIG. 6 | W - 0<br>X - 115/120 | W = 0<br>X = 115/120 |
|        | Y - 208/230<br>Z - 115/120 | Y = 0<br>Z = 115/120 |
| FIG. 7 | W = 208/230<br>X = 115/120 | W = 0<br>X = 115/120 |
|        | Y = 0<br>Z = 115/120 | Y = 0<br>Z = 115/120 |
| FIG. 8 | W = 115/120<br>X = 208/230 | W = 115/120<br>X = 0 |
|        | Y = 115/120<br>Z = 0 | Y = 115/120<br>Z = 0 |

For purposes of this discussion FIG. 5 and the related information in Columns I and II of TABLE II is considered a reference condition and as will be more fully evident hereinafter, a desired condition, i.e., the connections to the outlets or connectors (plugs) connected to the outlets are orientated to provide zero volts between Low-1 and Low-2. FIG. 6 and the related information in Columns I and II of TABLE II illustrate the effect of rotating connector No. 1; in a like manner FIG. 7 and its associated information illustrates the effect of rotating connector No. 2, and FIG. 8 and its associated information illustrates the effect of rotating both connectors 1 and 2. The effect of rotating the plugs associated with the outlets is, of course, the same as if the connections to the convenience outlets were reversed.

Whereas physical reversal of the connections to the convenience outlet terminals is physically possible, such is not a preferred embodiment due to matters of practicality, effective reversal of the plugs is contemplated to permit in accordance with the invention, utilizing the voltage from two outlets regardless of the particular manner in which the outlets are wired.

Directing attention now to the information in Column II of TABLE II, it will be observed that the information related to FIG. 8 and FIG. 7 is identical to the information related to FIG. 5 and FIG. 6 respectively. This correlates with the previous statement that six unique conditions may occur as the result of the possible connections which may be made by randomly selecting 2 convenience outlets within either of the electrical systems defined in FIGS. 3 and 4.

Broadly, in accordance with the invention, in order to utilize the voltages from two convenience outlets, first the condition is created as illustrated in FIG. 5 wherein the voltage from Low-1 to Low-2 (illustrated by indicator X) is zero for the conditions of Columns I and II of TABLE II. At this point it is convenient to consider the determination of whether 115/120 volt or 208/230 volt power is obtained.

By way of example, to accomplish the automatic connection of Low-1 to Low-2, two reversing relays in conjunction with four sensing relays may be utilized as illustrated in FIG. 9. A suitable reversing relay may be a conventional double pole double throw relay which reverses the two output wires when the relay is energized as and for the purposes hereinafter described.

While a specific arrangement has been disclosed hereinabove for establishing the desired condition of 0 volts between the Low-1 and Low-2 terminals it is to be understood that the invention is not so limited and that the invention contemplates the inclusion of equivalents. Thus, the desired orientation may be accomplished manually with the use of the indicator X. As previously noted the initial desired condition is obtained when zero volts exist across indicator X (see FIG. 5 for example). If the two plugs of the input power connectors or extension cords to be "plugged into" the outlets are each adapted to or permit rotation, then manual rotation of such plugs may be utilized to accomplish the same results as accomplished by the automatic circuitry of FIG. 9. For manual orientation (with an indicator X) a maximum number of only three steps or rotations of plugs will be required to obtain zero volts between Low-1 and Low-2 (extinguish indicator X), i.e., rotate the first plug, rotate the second plug, and then rotate the first plug back to its original position. Any other condition will require less than three rotations to a minimum of none if by chance the plugs are inserted into the outlets with the correct orientation.

The correct orientation can also be obtained manually with a single step by use of the indicators X, Y, W, and Z. Thus, with plugs adapted to or which permit rotation (effective reversal of their position in an outlet) the aforementioned desired condition is provided as follows:

1. If the Boolean expression $XZ\overline{W}$ occurs — reverse plug 1.
2. If the Boolean expression XZW occurs — reverse plug 2.
3. If the Boolean expression XYW occurs — reverse both plugs.

Manual implementation techniques as described above do of course eliminate the requirement for the sensing relays and the reversing relays. The implementation of these techniques, however, among other things requires the ability to invert either or both connectors and presently available connectors such as, for example, adapters to convert a three prong plug to a two prong plug, do not provide this ability without eliminating the safety grounding pin. However, use of a male-female adapter as shown in FIG. 10 or its equivalent permits retention of the safety grounding pin where present in an outlet.

An adapter as shown in FIG. 10 may be plugged into each outlet and with two recesses G1 and G2 electrically connected to the ground terminal G3 of the outlet, for receiving the ground pin of a conventional power cord plug (not shown), the power cord plug can be easily and simply rotated without losing the ground connection. Other modifications of the adapter will occur to those skilled in the art and a further modification is described in connection with FIG. 17. An adapter as shown in FIG. 11 can also be used. The adapter as shown in FIG. 11 comprises a male portion (not shown) to engage the outlet terminals in conventional manner and two female portions as shown to receive the male plug of the power cord. Since both ground pins are tied together and to the ground pin of the outlet, the inner terminals are tied to each other and to one terminal of the outlet, and the outer terminals are tied to each other and to the remaining outlet terminal, it will be seen that inversion will occur if the power cord plug is moved from one side to the other side. However, if such an adapter is used, prudence dictates that a sliding cover of some sort be provided to prevent access to the unused receptacle of such an adapter to avoid exposure of "hot" terminals and the possibility of insertion of a plug in the unused receptacle.

Automatic orientation via means other than that shown and described herein is also contemplated. Thus, for example, not only logic circuits but solid state devices such as transistors and the like may be used to accomplish the same function as the sensing relays X', W', Y', and Z' shown in FIG. 9. However, due to the lack of a ground commonality for X', W', Y', and Z', an optical coupling system may be used whereby indicators X, W, Y, and Z serve to illuminate associated photo cells. The photo cells may have a common connection and their output currents resulting from illumination used in conjunction with amplifying transistors to implement the Boolean expressions previously described, and thereby operate reversing relays or the like in an appropriate manner with the transistor outputs.

Directing attention now back to TABLE II and FIGS. 5–8, it will be seen that indicators or sensing devices, depending on which are used, are connected directly between the terminals of the two outlets and hence the power cords and therefore will cause the terminals of one of the power cords to be "hot" when connection is first made to an outlet with the other power cord. The same situation obtains of course when one of the two power cords is disconnected. FIG. 12 is a schematic representation of means for preventing such an undesirable condition. Thus, there may be provided as shown in FIG. 12 two relays K1 and K2 each having respectively contacts A1, B1, and A2, B2 for connecting the sensing devices W, X, Y, and Z as required across the AC input lines only after both power cords have been plugged into their respective outlets.

It has previously been pointed out that the invention includes orientation of two separate input voltages as and for the purposes hereinbefore pointed out, and upon establishing the desired orientation, determining whether a 115/120 or 208/230 volt system is obtained so that the resulting voltage can be properly applied to the power consuming device, typically an electrical motor or motors designed for operation on 115 or 230 volts.

Broadly, in accordance with the invention switching means, such as, for example, a four pole main contactor relay as shown in FIG. 13 may be utilized. However, it is to be understood that the invention is not limited to the particular switching means shown and described herein as the particular means used will at least in part depend on the device or devices to be supplied with power.

Referring now to FIG. 13, a four pole main contactor relay may be provided and maintained in a de-energized condition as shown while the previously described voltage orientation and determining processes are stabilized or are completed. If the five pole high voltage sense relay (actuated only if there is 208/230 volts) is de-energized as shown, a 115/120 volt system is indicated. The existence of a 115/120 volt system may be indicated in any suitable visual or aural manner by the energization or absence thereof of the high voltage sense relay. Actuation of the main contactor relay (manually or automatically after the outlet voltages have been properly oriented) results as shown in FIG. 13, in the connection of High-1 and High-2 input lines in parallel to a single predetermined terminal (the high voltage sense relay in this case is deenergized) such as P1 and the connection of Low-1 and Low-2 input lines in parallel to one or more different terminals such as T5, T4. With the above arrangement it will readily be seen that the two 115/120 volt AC lines (High-1, Low-1 and High-2, Low-2) have been properly applied in parallel to power input terminal P1 and T4, T5. The connections P1 and T4, T5 and the connections P2, J10, T3 and T2 are shown only by way of example, in this case for a General Electric Motor Model 5KC 49TG553X. SUch a motor is cited merely as an example since it requires more current than is normally available from a single conventional 115/120 volt outlet, but operates satisfactorily at 115/120 volts on the current supplied by two such properly paralleled outlets.

When the high voltage sense relay shown in FIG. 13 is energized, a 208/230 volt system results from the paralleling of two outlets and is thereby indicated. In this case, a 208 or 230 volt potential exists between High-1 and High0-2 and this potential is applied through the energized contacts of the main contactor relay and high voltage sense relay to terminals P1 and T5, T4 of the motor; Low-1 or Low-2 are left open ended at the high voltage sense relay and the appropriate connection of necessary terminals such as P2, J10, T3 and T2 for operation of the selected motor on 208/230 volts is made via the energized contacts of the high voltage sense relay as shown. It is to be understood that the specific switching functions discussed above are selected only by way of example to illustrate a typical application of the invention. A further and less complex example of another device that may be operated in accordance with the invention is an electrical heater having two 115 volt heating elements which are connectable in parallel or series to accommodate the available voltage. The switching functions required of the high voltage sense relay to accommodate such a heating device would obviously be less complex than those required to accommodate the motor selected for purposes of illustration.

In the event it is desired to use, for example, a motor or the like which on start-up does not draw more current than can be supplied by two outlets connected in parallel as described above, no further consideration need be given to supply of this current. However, in the event it is desired or necessary to use a motor or the like which, during start-up normally requires current in excess of that available from the two outlets in combination, shorting relay means as shown in FIG. 14 may be provided to limit the current during start-up.

Attention is now directed to FIG. 14 which shows means for inserting appropriately sized impedances Z1 and Z2 (depending on the characteristics of the motor or the like) in series with each main input line or winding of a motor. For this purpose a shorting relay is provided which, when energized completes a short circuit of each impedance Z1 and Z2 connected in series with the motor input lines as shown. When the impedances Z1 and Z2 are short circuited (the shorting relay is actuated) full voltage is applied to the motor. Since with 208/230 volt operation start-up current for the selected motor is not prohibitive, a contact closed by the high voltage sense relay as shown applies voltage to the shorting relay to energize it and thus short circuit the impedances Z as shown before voltage is applied to the motor.

In the 115/120 volt mode, start-up current is prohibitive for the selected motor. However, in this case the shorting relay will not be actuated and accordingly impedances Z1 and Z2 are connected in series with the motor to limit start-up current. The impedances Z1 and Z2 are conveniently removed or short-circuited for normal running by the application of a feedback voltage from the motor to the coil of the shorting relay as shown. When the motor RPM is high enough, the motor feedback voltage will also be high enough to actuate the shorting relay and remove the impedances from the line. As a protective measure, it is recommended that in the event the motor does not come up to normal speed within a reasonable time, a conventional time delay circuit as shown in FIG. 14 be provided effective to open the holding contacts of the main contactor relay and thereby remove power from the motor.

While a particular arrangement has been described for applying power to a device it is to be understood that the invention is not so limited and arrangements may be used to insert impedances in series with high starting current loads for a time duration appropriate to the particular device to maintain current flow at a desired level.

FIG. 15 shows means for providing protection against the application of voltage to the load under the condition of only one of the two selected power sources having voltage available, and, in addition, remove voltage from the load immediately in the event of failure of one of the two selected power sources following application of power to the load. THis is accomplished as shown in FIG. 15 through the utilization of switches C1 and C2 on each of the two relays, K1 and K2 previously described in FIG. 12. Referring to FIG, 15 it will be seen that the de-energized condition of either relay K1 or K2 will prevent application of voltage to or remove voltage from the coil of the main contactor relay.

FIG. 16 shows means for preventing application to the end device of power that is not phased properly or the inadvertent shorting together of two AC input lines that are not at the same potential. An automatic sensing system, either solid state or relay type as previously described may be used and will normally prevent the occurrence of either of the above conditions. However, improper operation of either a relay or solid state device could produce one or both of the above conditions. In a manual sensing system (such as that previously described with either one or four sensing indicators), either operator error or indicator failure could result in activation of the main contactor relay under the condition of incorrect AC phasing. Accordingly, to provide added safety to both automatic and manual sensing systems, an incorrect phase sense relay may be added across the Low-1 and Low-2 input connections to the main contactor relay as shown in FIG. 16. The incorrect phase sense relay is in the energized condition when improper phasing conditions exist (a potential exists between Low-1 and Low-2) and functions to open the contacts of the main contactor relay, thereby precluding application of voltage to the coil of the main contactor relay. Switches D1 and D2 (see FIG. 12) are inserted in series with the coil of the incorrect phase sense relay which is connected between Low-1 and Low-2 to prevent the exposed AC connector or extension cord from being "hot" when the other extension cord has been plugged into an outlet.

Attention is now directed to FIG. 17 which illustrates by way of example an embodiment of power conditioning apparatus in accordance with the invention adapted for operation of electric motors and in particular the aforementioned General Electric motor. This motor was selected for purposes of description because of its requirement of more current during start-up than is normally available from a single conventional 115/120 volt outlet, which will operate at 115 volts, and which operates on currents supplied by two such outlets properly connected to the motor windings.

It is to be understood that the aforementioned motor and circuit associated therewith, now to be described, has been selected merely for purposes of explanation and by way of example and that the voltages available in accordance with the invention may be used to supply electrical power to other electrical loads or load as circumstances may require or as may be appropriate. To facilitate understanding of the invention it is assumed that the conductors identified as Low-1 and Low-2 at receptacles J1 and J2 are connected to the center tap of an AC distribution system or systems, i.e., lines B or B1 of FIGS. 3 and 4. As will be more fully explained hereinafter, when this condition exists, the voltages available at plugs J1 and J2 will be properly phased. When the proper phase condition does not exist, then in accordance with the invention the phase of one and/or both voltages are varied to produce the proper phase connection at the power conditioning apparatus.

Further, as will become evident hereinafter, the conductors Low-1 and Low-2 are not physically connected together to define a single circuit. In point of fact, for low voltage operation (115 volts) the voltage or power from one line such as J1 is coupled to one winding of the two winding motor and the other line J2 is separately connected to the second winding of the motor. The connection of each line to separate windings eliminates the existence of a common connection in the power conditioning apparatus which may provide in some circumstances an undesirable current flow path for other extraneous loads which may be connected to the power distribution system but which are separate and distinct from the load or loads supplied by the power conditioning apparatus. Such a situation can occur if the conductors Low-1 and Low-2 are physically connected together to provide a common connection of center taps. Where the physical connection of conductors Low-1 and Low-2 do not result in an undesirable effect on external loads they may be physically connected together.

Manual rather than automatic implementation of phasing is contemplated in the arrangement shown in FIG. 17. Thus, receptacles J1 and J2 which may be male receptacles are adapted as shown in FIG. 17 (or as shown in FIG. 10 if desired) to permit rotation or reversal at the power conditioning apparatus of the extension cords which are connected to the outlets. Thus, receptacles J1 and J2 may be provided with axially located and commonly connected grounding pins as shown and the terminals for High-1 and Low-1 and High-2 and Low-2 conductors are oppositely disposed whereby the connection (and hence phase) of either extension line may be reversed without affecting the grounding of the system. The provision of the male receptacle on the power conditioning apparatus reduces the possibility of shock hazard from the extension cords.

Referring to FIG. 17 it will be seen that line indicator lamp I1 is connected between High-1 and Low-1 through fuses F1 and F2 as is the coil of line sense relay K1. Similarly, line indicator lamp I2 and the coil of line sense relay K2 is connected across High-2 and Low-2 through fuses F3 and F4. Incorrect phase indicator lamp I3 is connected across Low-1 and Low-2 through switches A1 and A2. Thus, if receptacles J1 and J2 are connected to separately fused outlets and the voltages therefrom are properly phased at receptacles J1 and J2 the incorrect phase indicator I3 will not be lit. However, if these voltages are improperly phased a voltage will be present between Low-1 and Low-2 and will cause the incorrect phase indicator I3 to be lit thereby simply and economically visually indicating an incorrect phase relationship. Other means can, of course, be used to indicate phase relationship if desired. Thus, as previously described for manual implementation, if the incorrect phase indicator I3 is lit upon connection of J1 and J2 to appropriate outlets, the operator simply provides the necessary correct phase relationship by first reversing the connection at receptacle J1. If the incorrect phase indicator I3 does not go out, he then reverses the connection at plug J2 and if the incorrect phase indicator I3 still does not go out, he need only then go back and reverse the connection at receptacle J1 at which point the incorrect phase indicator I3 will go out.

For convenience, the receptacles J1 and J2 (together with their female portions on the extension cords) may be scribed for a particular orientation such that if they are connected together with this orientation (the other or outlet ends of the extension cords having three prong connectors, they normally can only be plugged into an outlet in one manner) and if the outlets are wired in accordance with the electrical code, then power from the two outlets may be expected to have the proper phase relationship at the power conditioning apparatus. It is when this proper phase relationship condition does not occur that the incorrect phase indicator I3 will light and the operator must (for manual implementation) then go through the previously described simple procedure of reversing plugs, the procedure requiring a maximum of three steps in order to obtain the correct phase relationship. As a safety feature switches A1 and A2 are provided in series with the incorrect phase indicator I3 to prevent the existence of a current flow path from receptacle J1 to J2 when only one extension cord is connected to an outlet. The provision of such a current flow path could among other things result in electrical shock to an attendant or anyone touching or coming in contact with an exposed terminal of the unconnected receptacle. If both receptacles J1 and J2 are connected to outlets, then, of course, the incorrect phase indicator I3 is connected between Low-1 and Low-2. However, if as previously noted, one line is not connected, for example J1, switch A1 of relay K1 will be open and thereby prevent the existence of a current flow path from J2 to J1.

The high voltage operation indicator lamp I4 is connected in parallel with the coil of high voltage relay K5. As an additional safety feature, high voltage operation indicator I4 and high voltage relay K5 are both connected in series with switches B1 and B2 of respectively line sense relays K1 and K2 to prevent the existence of a current flow path between conductors High-1 and High-2 of receptacles J1 and J2 in the event only one of these receptacles are connected. It will be obvious that if, for example, receptacle J1 is not connected to an outlet line sense relay K1 will not be actuated and switches A1 and B1 will both be in their open position as shown. All of the switches in FIG. 17 are shown in their no power or unactuated position.

Switches C1 and C2 of respectively relays K1 and K2 are provided to prevent the application of current to the coil of the main contactor holding relay K7 unless relays K1 and K2 are actuated; i.e., both receptacles J1 and J2 have been connected to their respective outlets. As shown in FIG. 17, the lower end of the coil of relay K7 is connected directly to Low-1. The other end of the coil of relay K7 may be connected to High-1 via switch C1, C2, terminals 3–4 and 8–9 of normally closed time delay relay K9, start-up switch S1 and switch A3 of relay K3 which is shown in its normally closed and unactuated position. As more fully described hereinafter, relay K3 is actuated (and switch A3 actuated to its open position) when an improper phase relationship exists between receptacles J1 and J2.

As will now be evident, when connected as shown and described above, the main contactor holding relay K7 cannot be actuated if an improper phase relationship exists at receptacles J1 and J2. However, if a proper phase relationship exists at plugs J1 and J2, which is to say zero volts exist between Low-1 and Low-2, relay K3 is not actuated and current is supplied to the coil of relay K7 when start button S1 is operated thereby actuating relay K7 and main contactor relay switches A7 and B7.

Power cannot be supplied to the load because of the action of phase sensing relay K3 and its associated circuitry. Thus, even if the indication of an improper phase condition by indicator I3 is ignored, a voltage will exist across diode CR1 and resistors R1 and R2. This voltage is rectified and filtered by diode CR1 and capacitor C1 thereby causing transistor Q1 to conduct and energize relay K3. Capacitor C2 and zener diode CR2 form part of the relay circuit. When relay K3 conducts, the current flow path is from Low-1, through switch A2, transistor Q1, the coil of relay K3, resistor R3, and diode CR3 to High-2.

For an embodiment of the type shown in FIG. 17 and disclosed herein, it is deemed desirable that the voltage to the load (in this case a motor) be entirely removed in the event of loss of power via one of the extension cords. Such a loss of power may happen, for example, by the failure of a fuse in the electrical distribution system or by an extension cord being disconnected. The removal of power when the motor is connected for 208 volt operation is accomplished by the deactuation of the appropriate line sense relay K1 or K2. Thus, for high voltage (208 volt) operation, when either relay K1 or K2 is deactivated by the removal of power to the appropriate plug J1 or J2, this causes the circuit to the main contactor holding relay K7 (and, hence, main contactor relay K4) to be broken and power entirely removed from the motor as explained in quite some considerable detail hereinbefore. However, for motors of the type and connected for 115 volt operation as herein described, it was unexpectedly found that the removal of one extension cord (without protective circuitry described below) did not result in the deactuation of either relay K1 or K2.

It is to be remembered that in 115 volt operation, the two main windings of the motor are each separately connected to a different 115 volt supply. Starting with this in mind, it was determined that the 115 volts applied to the winding connected to a 115 volt supply induced a voltage of approximately 115 volts in the other unconnected winding, and this induced voltage appeared across the line sense relay of the disconnected line, and this induced voltage at the line sense relay prevented it from being deactuated or dropping out. The failure of the relays K1 or K2 to drop out left not only the motor running on one winding, but the disconnect plug "hot".

To insure that all power will be removed from a load such as the selected motor connected for 115 volt operation, suitable sensing and actuating circuit means for this purpose must be provided. One type of suitable means may be a high impedance voltage sensing circuit now to be described by way of example coupled between Low-1 and Low-2.

Since the impedance connected between Low-1 and Low-2 is very high with respect to the impedance connected between High-1 and High-2, the potential difference between High-1 and High-2 remains at approximately zero when either Low-1 High-1 or Low-2 and High-2 are disconnected from the electrical distribution system, and any potential difference in the line voltage applied and the induced feedback voltage from the motor winding previously referred to appears across Low-1 and Low-2. This voltage that appears across Low-1 and Low-2 with one line disconnected is utilized in the following manner to energize a relay (relay K3) to disconnect the holding relay K7 and, hence, the main contactor relay K4.

If either of the extension cords is disconnected, the induced voltage from the motor and applied across the relay of the disconnected line is slightly different from the applied or line voltage. High-1 and High-2 are at this time connected together through the relatively low impedance of relay K5 and the aforementioned difference in voltage between the induced voltage and the line voltage appears between Low-1 and Low-2. This voltage difference (as will the voltage difference due to improper phasing) causes transistor Q1 to conduct and energize relay K3 and, via its switches, disconnect holding relay K7 which results in the removal of all voltage to the motor which of course then comes to a stop.

One end (the lower end as shown in FIG. 17) of the coil of the main contactor relay K4 is connected as shown directly to Low-1 and the other end may be connected to High-1 via switch B7 of relay K7 and switch A3 of relay K4. A proper phase relationship being present at plugs J1 and J2, (switch A3 is closed as shown), it will now be evident that when the start button S1 is actuated or closed, this is effective to connect relay K7 between Low-1 and High-1 and actuate it as previously described. Actuation of holding relay K3 closes switch B7 to initially actuate the main contactor relay K4.

Relay K4 having been initially actuated as described above, it is of course necessary, other requirements more fully described hereinbelow having been met, that relay K4 be maintained in its actuated position to permit a continuous supply of power to the load. This is achieved by short circuiting the start button S1 in the following manner to connect the coil of holding relay K7 across High-1 and Low-1 even though the start button is released. Thus, when relay K4 is initially actuated, switch D4 thereof, one terminal of which is connected to High-1, is closed and a circuit completed through the coil of relay K7 to Low-1 via terminal V10, terminals P1 and P2 of the thermal breaker switch in the motor, switch B3 of relay K3, the stop button S2, switch A7 of the main contactor holding relay K7, and the time delay relay K9 and thereby eliminating the necessity of the connection to High-1 via the start button S1. Thus, when the start button S1 is released, relay K7 remains connected across Low-1 and Low-2 via the above described circuit. While this circuit may appear rather complicated it should be noted that if the thermal breaker switch in the motor opens due to a malfunction, overloading or the like, or alternately the main contactor relay K4 opens or is caused to open for any reason, the holding relay K7 will be opened.

As previously described, the coil of high voltage sense relay K5 is connected to High-1 via switch B1 of relay K1 and to High-2 via switch B2 of relay K2. Thus, if a voltage exists between High-1 and High-2 after a proper phase condition is established it must be either 208 or 230 volts and this will cause the high voltage operating indicator K4 to be lit thereby indicating a high voltage operation and actuation of high voltage sense relay K5 which is sized to operate on only substantial 208 volts. If, of course, the high voltage operating indicator I4 is not lit after a proper phase condition is established this is indicative of low power or 115 volt operation.

Directing attention particularly now to the high voltage sense relay K5 which is shown in its deenergized or low voltage position, its associated switches B5, C5, and D5 are utilized to effect for 115 volt operation the connections required for the particular motor here described. When high voltage sense relay K5 is actuated (208/230 volts exist between High-1 and High-2), its switches B5, C5, and D5 connect the motor for 208 volt operation as shown in FIG. 18.

Referring now to FIG. 19 which illustrates connection of the motor for 110 volt operation, when relay K5 is in its deenergized position as shown in FIG. 17, one terminal of switch A5 is connected to High-1 via switch A6 of the feedback sense relay K6 which is initially in its open position as shown in FIG. 17. One end of the coil of feedback sense relay K6 is connected to terminal T8 of the motor and the other end of the coil is connected to Low-1. During start up of the motor when the voltage developed by the motor reaches a sufficient level, feedback sense relay K6 is actuated by this voltage and causes switch A6 to close, thereby providing connection via switch A6 from High-1 through switch A5 of relay K5 when it is in its unactuated position as shown, the coil of shorting relay K8 and through the coil of relay K8 to Low-1. Actuation of shorting relay K8 is effective to actuate its switches A8 and B8 and thereby short circuit the starting reactances Z1 and Z2 which are connected in series with respectively main windings 1 and 2 of the motor (see FIG. 19). From the above it will now be seen that for the case of high voltage operation (zero volts exist between Low-1 and Low-2 and 208/230 volts exist between High-1 and High-2), high voltage sense relay K5 is actuated and this is effective to short circuit impedances Z1 and Z2 which are unnecessary for high voltage operation.

Attention is now directed to the time delay relay K9. As shown in FIG. 17 it will be noted that terminal 1 of relay K9 is connected to High-2 and that terminal 6 is connected to switch A8 of the shorting relay K8, through switch A8 to switch A4 of the main contactor relay K4, through switch 4 to switch B5 of the high voltage sense relay K5 and through switch B5 to Low-2. Thus, for low voltage operation (zero volts exist between Low-1 and Low-2 and 115/120 volts exist between High-1 and High-2), if the shorting relay K8 is not actuated within the operating time of the time delay relay such as for example two seconds, the time delay relay K9 is actuated, thereby breaking the connection between terminals 3-4 and 8-9 and opening the circuit to the main contactor holding relay K7 which in turn opens the circuit to main contactor relay K4 and thereby shutting down the system. For reasons of economy and simplicity, series reactances Z1 and Z2 are sized such that for 115 volt operation of the motor, if the motor does not come up to rated speed within the operating time of the time delay relay K9, which time is, of course, selected to be not substantially longer than that required for the motor to normally reach rated speed, they will be damaged or destroyed. Accordingly, time delay relay K9 is provided to protect start up reactances Z1 and Z2. As previously pointed out, in the case of high voltage operation shorting relay K8 is actuated and this removes time delay relay K9 from the circuit since switch A8 of shorting relay K8 is open to break the circuit to terminal 6 of time delay relay K9.

Where power conditioning apparatus as shown and described herein supplies power to a load or loads such as, for example as shown in FIG. 17, a balanced load is provided for the two AC lines. However, where it is necessary to supply power to other loads, such as, for example, in carpet cleaning apparatus as shown and described in connection with FIGS. 1 and 2, it is important that these loads be connected to the two AC lines in such a manner that they represent at least substantially balanced loads on the AC lines. Thus, referring to FIGS. 1 and 2, whereas a high current vacuum drive motor 58 is connected as shown in FIG. 17, the drive motor 15 should be coupled to AC extension cord 1 and the heater 33 coupled to AC extension cord 2 in such a manner as may be desired or convenient to present balanced loads on these input lines removable when the main contactor relay K4 or the like is not actuated. Satisfactory operation of carpet cleaning apparatus has been obtained utilizing a heater 33 and a drive motor 15 each requiring about three to four amperes and a vacuum drive motor 58 as described herein.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

What is claimed is:

1. In cleaning apparatus the combination comprising:
   a. a cleaning solution reservoir tank system, said system comprising reservoir tank means for holding a liquid cleaning solution, and liquid pump means having an inlet coupled to said reservoir tank means for pumping said cleaning solution from said tank;
   b. a vacuum tank pick-up system, said system comprising vacuum tank means for receiving soiled cleaning solution, air suction-blower means having an inlet coupled to said vacuum tank means for evacuating air from said tank, and electric drive motor means for actuating at least said section-blower means, said drive motor means requiring more current for normal operation than is available from a single 115/120 volt convenience outlet; and
   c. power control means for coupling said drive motor means to two separate convenience outlets for driving said drive motor means at a single voltage.

2. The combination as defined in claim 1 wherein said power control means includes:
   a. means for providing the voltage at one of said outlets to first and second terminals and the voltage at the other of said outlets to third and fourth terminals, there being zero voltage between said second and fourth terminals; and
   b. means for determining the magnitude of the voltage between said first and third terminals.

3. The combination as defined in claim 2 wherein said drive motor means includes first and second windings connectable for 115/120 and 208/230 volt operation; and additionally including means for connecting said windings for 208/230 volt operation and coupling said first and third terminals to said windings for 208/230 volt operation when at least about 208 volts exist between said first and third terminals.

4. The combination as defined in claim 2 wherein said drive motor means includes first and second windings connectable for operation on 115/120 and 208/230 volts, and additionally including means for connecting said windings for 115/120 volt operation and coupling said terminals to said windings for 115/120 volt operation when the voltage between said first and third terminals is zero.

5. The combination as defined in claim 4 wherein said first and second terminals are connected to one of said windings and said third and fourth terminals are separately connected to the other winding.

6. The combination as defined in claim 1 and additionally including a plurality of electrical power consuming devices; and means for coupling said power consuming devices to said separate outlets whereby the total electrical power supplied from said outlets to said plurality of power consuming devices is substantially equally divided between said separate outlets.

7. The combination as defined in claim 1 wherein said cleaning solution reservoir tank system includes further electric drive motor means for actuating said liquid pump means and electrical heater means for heating cleaning solution exhausted from said liquid pump means; means for coupling said further drive motor means to one of said outlets; and further means for coupling said heater means to the other outlet.

8. The combination as defined in claim 6 wherein the current drawn by said further motor means is substantially equal to the current drawn by said heater means.

9. In two tank cleaning apparatus the combination comprising:
   a. a cleaning solution reservoir tank system, said system comprising reservoir tank means for holding a liquid cleaning solution, liquid pump means having an inlet coupled to said reservoir tank means for pumping said cleaning solution from said tank, and first electric drive motor means for actuating said liquid pump means;

b. a vacuum tank pick-up system, said system comprising vacuum tank means for receiving soiled cleaning solution, air suction-blower means having an inlet coupled to said vacuum tank means for evacuating air from said tank, and second electric drive motor means for actuating said suction-blower means, said second drive motor means requiring more current for normal operation than is available from a single 115/120 volt convenience outlet; and c. power control means for coupling said second drive motor means to two separate convenience outlets for driving said second drive motor means at a single voltage.

10. The combination as defined in claim 9 wherein said power control means includes means for supplying the voltage of said outlets to said motor in phase with one another.

11. The combination as defined in claim 9 wherein said power control means includes means for determining the phase of the voltages at said outlets.

12. The combination as defined in claim 11 wherein said power control means includes means for supplying the voltages of said outlets to said motor in phase.

13. The combination as defined in claim 9 wherein said power control means includes:

a. means for providing each of said voltages at separate pairs of terminals with a predetermined phase relationship, and b. means for determining the magnitude of the voltage at different ones of said terminals.

14. The combination as defined in claim 13 and additionally including means for coupling the voltage between predetermined ones of said terminals to said motor.

15. The combination as defined in claim 9 wherein said power control means includes:

a. means for providing the voltage at one of said outlets to first and second terminals and the voltage at the other of said outlets to third and fourth terminals, there being zero voltage between said second and fourth terminals; and b. means for determining the magnitude of the voltage between said first and third terminals.

16. The combination as defined in claim 15 wherein said second drive motor means includes first and second windings connectable for 115/120 and 208/230 volt operation; and additionally including means for connecting said windings for 208/230 volt operation and coupling said first and third terminals to said windings for 208/230 volt operation when at least about 208 volts exist between said first and third terminals.

17. The combination as defined in claim 15 wherein said second drive motor means includes first and second windings connectable for operation on 155/120 and 208/230 volts, and additionally including means for connecting said windings for 115/120 volt operation and coupling said terminals to said windings for 115/120 volt operation when the voltage between said first and third terminals is zero.

18. The combination as defined in claim 17 wherein said first and second terminals are connected to one of said windings and said third and fourth terminals are separately connected to the other winding.

19. Apparatus for supplying electrical power to a load from first and second sources of electrical power at a first voltage level comprising:

a. sensing circuit means adapted for connection to said sources of electrical power and coupling them to two sets of terminals with a predetermined phase relationship at said sets of terminals, the voltage between one predetermined terminal of each set being zero;

b. first means for determining the voltage between the other terminals of each said set of terminals; and c. second means for coupling the voltages at said sets of terminals in phase to said load.

20. The combination as defined in claim 19 wherein said second means is actuated by said first means and couples said voltages to said load for operation at a predetermined voltage level.

21. The combination as defined in claim 20 wherein said second means is actuated when the voltage between said other terminals is greater than said first voltage.

22. The combination as defined in claim 20 and additionally including means for preventing actuation of said sensing circuit means unless said electrical power from both said sources is coupled to said sensing circuit means.

23. The combination as defined in claim 20 and additionally including means for preventing actuation of said first means unless said electrical power is coupled to both said sets of terminals.

24. The combination as defined in claim 20 wherein said second means has a first position for coupling said voltages at said sets of terminals to said load for operation of said load at substantially said first voltage level when said voltage between said other terminals is not substantially greater than said first voltage level and a second position for coupling said voltages at said sets of terminals to said load for operation of said load at a voltage level substantially greater than said first voltage level when said voltage between said other terminals is substantially greater than said first voltage level.

25. Apparatus for supplying electrical power from first and second convenience electrical power outlets to an electrical motor having first and second main windings, said motor having normal operating electrical power requirements greater than that normally available from a single convenience outlet but less than that normally available from two convenience outlets, comprising:

a. sensing circuit means adapted for connection to said convenience outlets and coupling them to two sets of terminals with a predetermined phase relationship at said sets of terminals, the voltage between one predetermined terminal of each set being zero;

b. first means for determining the voltage between the other terminals of each said set of terminals; and c. second means for coupling the voltages at said sets of terminals in phase to said windings.

26. The combination as defined in claim 25 wherein said second means couples said sets of terminals to said windings for operation at the voltage between said other terminals when the voltage between said other terminals is greater than the voltage at either of said convenience outlets.

27. The combination as defined in claim 25 wherein said second means couples one set of terminals to one winding and the other set of terminals to the other winding when the voltage between said other terminals is not substantially greater than the voltage of said convenience outlets.

28. The combination as defined in claim 26 wherein said second means couples one set of terminals to one winding and the other set of terminals to the other winding when the voltage between said other terminals is not substantially greater than the voltage of said convenience outlets.

29. The combination as defined in claim 27 and additionally including means for removably inserting starting reactances in series with said windings to limit start-up current when the voltage between said other terminals is not substantially greater than the voltage of said convenience outlets.

30. The combination as defined in claim 29 and additionally including shorting means for short circuiting said starting reactances when said motor reaches a predetermined number of revolutions per minute.

31. The combination as defined in claim 30 wherein said shorting means includes further means coupled to one of said windings effective to actuate said shorting means to short circuit said starting reactances when the back electromotive force of said motor reaches a predetermined value.

32. The combination as defined in claim 27 wherein said sensing circuit means includes further means for disconnecting said sensing circuit means from said outlets when voltage exists at only one of said sets of terminals.

33. The method of supplying electrical power to a load from first and second sources of electrical power at a first voltage level comprising:
   a. determining the phase of the voltage at said sources;
   b. coupling said voltages to two sets of terminals with a predetermined phase relationship, the voltage between one predetermined terminal of each set being zero;
   c. determining the voltage between the other terminals of each said set of terminals; and
   d. coupling the voltages at said sets of terminals in phase to said load.

34. The method as defined in claim 33 wherein said voltages at said sets of terminals are coupled to said load for operation at substantially the level of voltage between said other terminals when the voltage between said other terminals is substantially greater than said first voltage level.

35. The method as defined in claim 33 wherein said voltages at said sets of terminals are coupled to said load for operation at said first voltage level when the voltage between said other terminals is zero.

36. The method of supplying electrical power from first and second convenience electrical power outlets at a first voltage level to an electrical motor having first and second main windings, said motor having normal operating power requirements greater than that normally available from one of said outlets but less than that normally available from both said outlets, comprising:
   a. determining the phase of the voltage at said outlets;
   b. providing said voltages at two sets of terminals with a predetermined phase relationship, the voltage between one predetermined terminal of each said set being zero;
   c. determining the voltage between the other terminals of each said set of terminals; and
   d. coupling said sets of terminals to said windings for operation of said motor at a predetermined voltage level determined by the voltage between said other terminals.

37. The method as defined in claim 36 wherein start-up reactances are connected in series with each of said windings during start-up when the voltage between said other terminals is not substantially greater than said first voltage level and are short circuited when the revolutions per minute of said motor reach a predetermined level.

38. The method as defined in claim 36 wherein voltage provided at said sets of terminals is removed when said first voltage level is coupled to only one of said sets of terminals.

39. The method of supplying electrical power from first and second convenience electrical power outlets at a first voltage level to a plurality of electrical power consuming loads including an electrical motor having normal operating power requirements greater than that normally available from one of said outlets but less than that normally available from both said outlets, comprising:
   a. determining the phase of the voltage at said outlets;
   b. providing said voltages at two sets of terminals with a predetermined phase relationship, the voltage between one predetermined terminal of each said set being zero;
   c. determining the voltage between the other terminals of each said set of terminals;
   d. coupling said sets of terminals to said motor for operation of said motor at a predetermined voltage level determined by the voltage between said other terminals; and
   e. coupling the balance of said power consuming devices to said first and second outlets whereby the total electrical power supplied to said balance of power consuming devices is substantially equally divided between said first and second outlets.

* * * * *